US007641005B2

(12) United States Patent
Cong

(10) Patent No.: US 7,641,005 B2
(45) Date of Patent: Jan. 5, 2010

(54) WIND-POWERED PNEUMATIC ENGINE AND A MOTOR VEHICLE EQUIPPED WITH THE ENGINE

(76) Inventor: Yang Cong, Flat 30C, Block B, Quig Tian Hua Ting, Shang Bao Lu, Fu Tian District, Shenzhen, Guangdong Province (CN) 518034

( * ) Notice: Subject to any disclaimer, the term of this patent is extended or adjusted under 35 U.S.C. 154(b) by 167 days.

(21) Appl. No.: 11/802,341

(22) Filed: May 22, 2007

(65) Prior Publication Data
US 2007/0284155 A1    Dec. 13, 2007

Related U.S. Application Data

(63) Continuation of application No. PCT/CN2005/001911, filed on Nov. 14, 2005.

(30) Foreign Application Priority Data

| Nov. 22, 2004 | (CN) | ............ 2004 1 0091154 |
| Aug. 16, 2005 | (CN) | ............ 2005 1 0090760 |
| Nov. 2, 2005  | (CN) | ............ 2005 1 0117451 |

(51) Int. Cl.
  *B60L 9/00* (2006.01)
  *B60L 8/00* (2006.01)
  *B60K 16/00* (2006.01)
(52) U.S. Cl. .................. 180/2.2; 180/2.1
(58) Field of Classification Search .......... 180/2.1, 180/2.2
  See application file for complete search history.

(56) References Cited

U.S. PATENT DOCUMENTS 3,444,946 A * 5/1969 Waterbury ............ 180/2.2
3,967,132 A * 6/1976 Takamine ............ 290/4 R
4,179,007 A * 12/1979 Howe ............... 180/2.2
4,254,843 A * 3/1981 Han et al. ........... 180/165
6,138,781 A * 10/2000 Hakala .............. 180/2.2
6,270,308 B1   8/2001 Groppel ............ 415/4.3

FOREIGN PATENT DOCUMENTS

| CN | 2073484 U  | 3/1991 |
| CN | 2242352 Y  | 12/1996 |
| CN | 1351228 A  | 5/2002 |
| FR | 2292129    | 6/1976 |

* cited by examiner

*Primary Examiner*—Paul N Dickson
*Assistant Examiner*—John R Olszewski
(74) *Attorney, Agent, or Firm*—Jacobson Holman PLLC

(57) ABSTRACT

A wind-powered pneumatic engine including one or more impeller chambers and one or more impellers disposed in the impeller chambers is provided. One or more air inlets for receiving external wind resistance airflow are disposed on the impeller chambers, and the external wind resistance airflow entering the air inlets drives the impellers to operate to generate power output. The wind-powered pneumatic engine further includes an air-jet system for jetting HPCA into the impeller chambers, and the internal high-pressure compressed air jetted by the air-jet system in conjunction with the external wind resistance airflow entering the air inlets drives the impellers to operate to generate power output. In the present invention, the external resistance airflow around a motor vehicle moving at a speed is converted into power for use, which greatly reduces energy consumption and improves the moving speed of a motor vehicle. A motor vehicle equipped with wind-powered pneumatic engine is also provided.

17 Claims, 5 Drawing Sheets

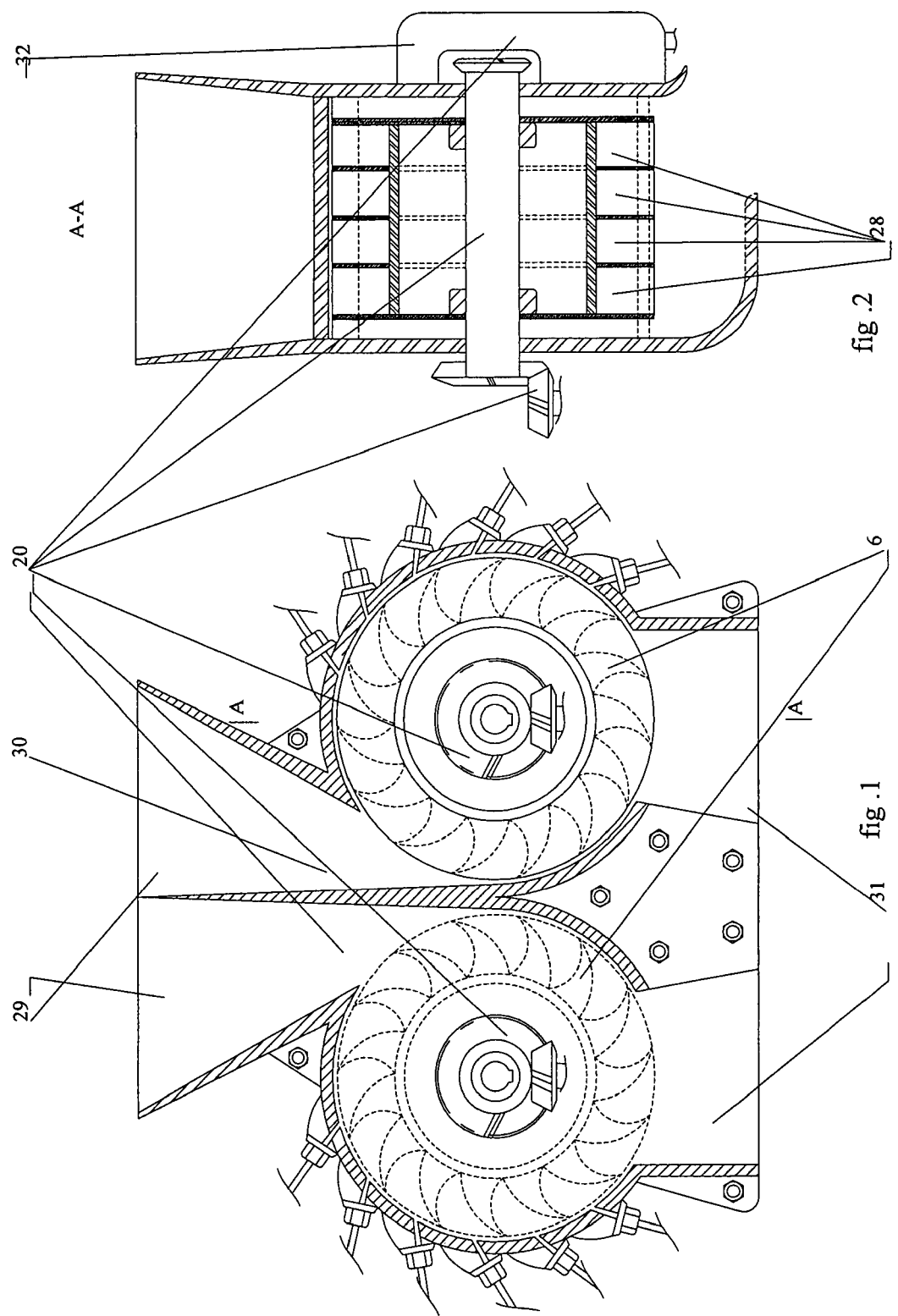

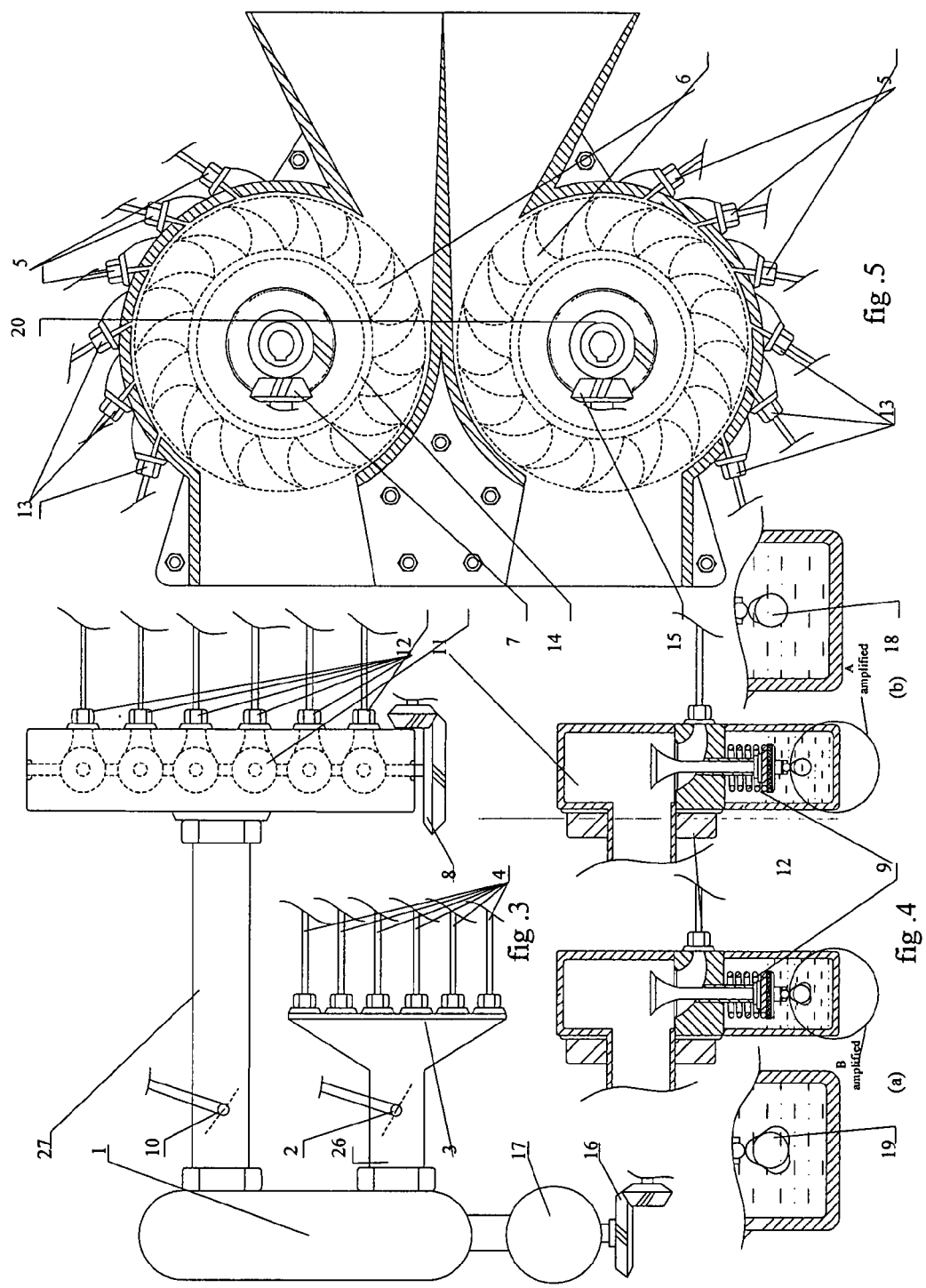

US 7,641,005 B2

WIND-POWERED PNEUMATIC ENGINE AND A MOTOR VEHICLE EQUIPPED WITH THE ENGINE

CROSS-REFERENCE TO RELATED APPLICATIONS

This patent application is a continuation application of application PCT/CN2005/001911 filed Nov. 14, 2005 and published in Chinese, and claims the benefit of Chinese Patent Application No. 200410091154.2 filed Nov. 22, 2004, Chinese Patent Application No. 200510090760.7 filed Aug. 16, 2005, and Chinese Patent Application No. 200510117451.4 filed Nov. 2, 2005.

BACKGROUND OF THE INVENTION

1. Field of the Invention

The present invention relates to an engine installed in large, medium or small size cargo or passenger vehicles having steering wheels, railway trains, subway trains, marine travel vehicles, aerospace travel vehicles and all other motor vehicles that move at a certain speed, and relates to the field of machines.

2. Description of Related Art

Engines using fuels as an energy source consume a large quantity of fuels, and discharge large amounts of waste gases and hot gases, which pollute the environment. In order to save fuel energy source and protect the global environment, there is a need for engines that do not consume fuel, discharge waste gases and hot gases or cause pollution. Conventional engines that convert wind force into mechanical kinetic energy are installed in fixed places. Since the mechanical devices installed with the engines do not move at a speed, the engines can only passively receive limited wind force under natural weather, ambient and wind conditions for driving impellers to operate and generate the mechanical kinetic energy. Therefore, there is a need for an engine capable of actively converting wind resistance airflow around a motor vehicle moving at a speed into mechanical power for use.

SUMMARY OF THE INVENTION

The present invention is directed to providing a wind-powered pneumatic engine capable of converting wind resistance airflow around a moving power machine into mechanical power for use without consuming fuels and discharging waste gases or hot gases, and a motor vehicle equipped with the same.

The present invention is further directed to providing a wind-powered pneumatic engine using high-pressure compressed air (HPCA) as a direct power source, and a motor vehicle equipped with the same.

The present invention is further directed to providing a wind-powered pneumatic engine capable of converting the wind resistance airflow into mechanical power, converting the mechanical power into regeneration HPCA and storing the regeneration HPCA for use, and a motor vehicle equipped with the same.

The present invention is still further directed to providing a wind-powered pneumatic engine capable of recycling inertia power when a motor vehicle is decelerated and braked, transforming the inertia power into regeneration HPCA and storing the regeneration HPCA for use, and a motor vehicle equipped with the same.

The technical solution for achieving the above objects is described as follows.

A wind-powered pneumatic engine includes impeller chambers and impellers disposed in the impeller chambers. Air inlets for receiving external wind resistance airflow are disposed on the impeller chambers, and the external wind resistance airflow entering the air inlets drives the impellers to operate to generate power output.

The wind-powered pneumatic engine further includes an air-jet system for jetting the HPCA into the impeller chambers, and the HPCA jetted by the air-jet system in conjunction with the external wind resistance airflow entering the air inlets drives the impellers to operate to generate power output.

The air inlets for receiving the external wind resistance airflow are trunk shape inlets, each having a large outer edge and a small inner edge.

The wind-powered pneumatic engine further includes an HPCA regeneration, storage and supply system composed of an air tank and a first HPCA compressor. An output of the air tank is connected with the air-jet system. The power output generated after the operation of the impellers drives the first HPCA compressor. The HPCA regenerated by the first HPCA compressor is input into and stored in the air tank.

The wind-powered pneumatic engine further includes a second HPCA compressor driven by an external braking force. The second HPCA compressor regenerates and converts the external braking force into HPCA, which is then input into and stored in the air tank.

The air-jet system includes a first controller, a distributor, a first air-jet pipe set and a first air-jet nozzle set connected in sequence. The HPCA stored in the air tank is input into the distributor through the first controller, and is then diverged by the distributor and input into each air-jet pipe of the first air-jet pipe set. Then, the HPCA is jetted into the impeller chambers by each air-jet nozzle of the first air-jet nozzle set connected with each air-jet pipe of the first air-jet pipe set.

The air-jet system further includes a second controller, a distribution controller for converting the input HPCA into intermittent burst HPCA, a second air-jet pipe set, and a second air-jet nozzle set connected in sequence. The HPCA stored in the air tank is input into the distribution controller through the second controller. The intermittent burst HPCA is generated by the distribution controller and distributed to each air-jet pipe of the second air-jet pipe set, and is then jetted into the impeller chambers by each air-jet nozzle of the second air-jet nozzle set connected with each air-jet pipe of the second air-jet pipe set.

The impeller chambers are dual impeller chambers, each having an impeller disposed therein. Air inlets for receiving the external wind resistance airflow are disposed on at least one of the impeller chambers.

A motor vehicle, including a vehicle body, a gear box, a drive bridge, and tires, is characterized by further including a wind-powered pneumatic engine having impeller chambers and impellers disposed in the impeller chambers. Air inlets for receiving external wind resistance airflow are disposed on the impeller chambers, and the air inlets are trunk shape inlets, each having a large outer edge and a small inner edge. The outer edge of the trunk shape inlet is disposed at the front end of the vehicle body. The external wind resistance airflow entering the air inlets drives the impellers to operate to generate power output. The power output of the impellers is transmitted by the gear box to drive the drive bridge, and the drive bridge drives the tires supporting the vehicle body.

The wind-powered pneumatic engine further includes an air-jet system for jetting HPCA into the impeller chambers. The internal HPCA jetted by the air-jet system in conjunction with the external wind resistance airflow entering the air inlets drives the impellers to operate to generate power output.

The wind-powered pneumatic engine further includes an HPCA regeneration, storage and supply system composed of an air tank and a first HPCA compressor. An output of the air tank is connected with the air-jet system. The power output generated after the impellers' operation drives the first HPCA compressor. The HPCA regenerated by the first HPCA compressor is input into and stored in the air tank.

The wind-powered pneumatic engine further includes a deceleration and brake pressurizing system and a second HPCA compressor. The second HPCA compressor is driven by a braking force generated by the deceleration and brake pressurizing system when the engine is decelerated to regenerate HPCA. The regenerated HPCA is input into and stored in the air tank.

The air-jet system includes a first controller, a distributor, a first air-jet pipe set, and a first air-jet nozzle set connected in sequence, and includes a second controller, a distribution controller for converting the input HPCA into intermittent burst HPCA, a second air-jet pipe set, and a second air-jet nozzle set connected in sequence. The HPCA stored in the air tank is input into the distributor through the first controller, and is then diverged by the distributor and input into each air-jet pipe of the first air-jet pipe set. The HPCA is jetted into the impeller chambers by each air-jet nozzle of the first air-jet nozzle set connected with each air-jet pipe of the first air-jet pipe set. The HPCA stored in the air tank is input into the distribution controller through the second controller. The intermittent burst HPCA is generated by the distribution controller and distributed to each air-jet pipe of the second air-jet pipe set, and is then jetted to the impeller chambers by each air-jet nozzle of the second air-jet nozzle set connected with each air-jet pipe of the second air-jet pipe set.

The impeller chambers are dual impeller chambers, each having an impeller disposed therein. Air inlets for receiving the external wind resistance airflow are disposed on at least one of the impeller chambers.

The impeller chambers are dual impeller chambers, each having an impeller disposed therein. The distribution controller includes a valve set and cams for opening or closing the valve set, in which the power output of one impeller drives the first HPCA compressor, and the power output of the other impeller drives the cams.

With the above technical solution, the present invention has the following beneficial technical effects.

1. With the air inlets for receiving the external wind resistance airflow disposed on the impeller chambers, the external wind resistance airflow entering the air inlets is used as power to drive the impellers to operate to generate power output, thereby converting the resistance into power. Moreover, the higher the moving speed of the power machine is, the greater the utilization of the strong wind resistance airflow is. Therefore, the present invention, when adopted as an auxiliary power, can significantly increase the moving speed of the power machine without increasing the amount of energy consumed when moving at a high speed. The wind-powered pneumatic engine of the present invention can be installed in large, medium or small size cargo or passenger vehicles having steering wheels, railway trains, subway trains moving on land, marine power machines, aerospace power machines and all other power machines that move at a speed. In addition, in the present invention, the wind resistance airflow is used to drive the engine directly, without consuming fuels and discharging waste gases or hot gases, thereby greatly reducing exhaust gases of the power machines, especially vehicles that cause pollution to the atmosphere, and thus protecting the global environment.

2. Furthermore, the HPCA is used as the power, and the HPCA jetted by the air-jet system in conjunction with the external wind resistance airflow entering the air inlets drives the impellers to operate to generate power output. Therefore, the present invention has the advantages of no fuel consumption, and no waste gases or hot gases discharges, and can achieve self-start and continuous operation to generate power output without being restricted by natural weather, ambient conditions, particularly wind conditions.

3. Through the HPCA regeneration, storage and supply system, the power output generated after the operation of the impellers is transmitted to the first HPCA compressor, and the first HPCA compressor inputs the regenerated HPCA into the air tank for storage. The wind resistance airflow around the power machine is regenerated and converted into HPCA which is stored to be recycled for use.

4. Through the deceleration and brake pressurizing device and the second HPCA compressor, the kinetic energy produced as the motor vehicle decelerates and brakes is transmitted to the second HPCA compressor, and the second HPCA compressor subsequently recycles the braking energy and uses the braking energy to regenerate HPCA to be input into and stored in the air tank, such that the utilization of the energy is further enhanced. This solution is particularly suitable for the motor vehicle that frequently decelerates, brakes, and stops.

5. Through the automatic intermittent burst and jetted HPCA, the air jet time is greatly shortened, thereby saving large usage amounts of the HPCA. This solution is suitable for the motor vehicles that travels over a long distance and a long time at a low speed or that frequently decelerates, idles, and accelerates, thereby ensuring the continuous moving of the motor vehicle.

6. By installing the air inlets of the wind-powered pneumatic engine at the front end of the motor vehicle, particularly at the position where the wind resistance is the greatest, the wind resistance airflow is used to the maximum extent, thereby generating optimal power output and increasing the moving speed of the motor vehicle.

In order to make the aforementioned and other objects, features and advantages of the present invention comprehensible, preferred embodiments accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic structural view of a wind-powered pneumatic engine;

FIG. 2 is a schematic structural view of the wind-powered pneumatic engine and a central primary power output gear box;

FIG. 3 is a schematic structural view of a HPCA regeneration, storage and supply system and an air-jet system of the wind-powered pneumatic engine;

FIGS. 4(a), (b) are schematic structural views of two types of distribution controllers;

FIG. 5 is a schematic structural view of the wind-powered pneumatic engine;

DESCRIPTION OF EMBODIMENTS

Figure 6:
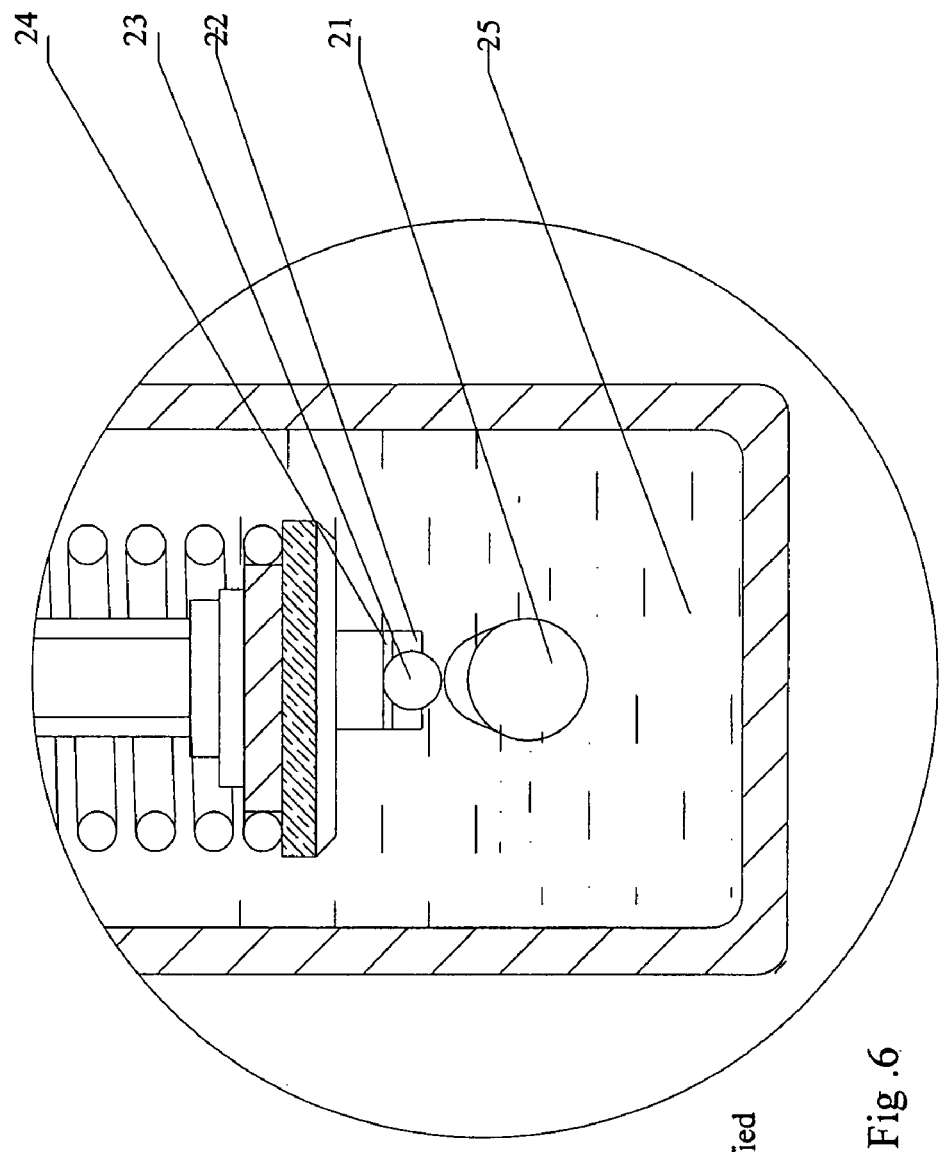
FIG. 6 is a schematic structural view of an improved distribution controller.

The present invention is further described in detail with accompanying drawings and embodiments.

As shown in FIGS. 1-8, a wind-powered pneumatic engine 20 includes trunk shape inlets, each having an outer edge 29 and an inner edge 30, impeller chambers 28, impellers 6, impeller flywheels 14, a left impeller main shaft auxiliary power conical gear 7, a right impeller main shaft auxiliary power conical gear 15, a primary power output gear box 32, and air outlets 31; a HPCA regeneration, storage and supply system, including an air tank 1, a first HPCA compressor 17, and a conical gear 16 for transmitting the first HPCA compressor 17; an air-jet system for start and acceleration, including a first controller 2 for opening the HPCA to perform start and acceleration, a distributor 3, a first air-jet pipe set 4 connected with the distributor 3, a first air-jet nozzle set 5, a second controller 10 for opening the HPCA to perform automatic intermittent burst air-jet acceleration, a distribution controller 11, a second air-jet pipe set 12 connected with the distribution controller 11, a second air-jet nozzle set 13, a conical gear 8, an HPCA jet pipe 26, and an HPCA jet pipe 27; a deceleration and brake pressurizing system, including a deceleration and brake pressurizing device 42 and a high-load second air compressor 41.

Referring to FIGS. 1, 2 and 5, impellers 6 and impeller flywheels 14 are disposed in the symmetrical dual impeller chambers 28, and air-jet nozzle sets (5, 13) are disposed on the impeller chambers 28. The HPCA is jetted into the impeller chambers 28 through the air-jet nozzle sets (5, 13), and the HPCA drives the impellers 6 to operate and is exhausted via the air outlets 31. The impeller chambers 28 are further provided with the trunk shape inlets for receiving external wind resistance airflow. The trunk shape inlet has the outer edge 29 and the inner edge 30, and the diameter of the outer edge 29 of the trunk shape inlet is 1-30 times, preferably 3.6 times, of the diameter of the inner edge 30. The external wind resistance airflow enters the impeller chambers 28 through the trunk shape inlets to drive the impellers 6 to operate, the external wind resistance airflow after driving the impellers 6 to operate is exhausted via the air outlets 31. The power generated after the operation of the impellers 6 is gear-shifted and output through the central primary power output gear box 32. In order to make the impellers 6 operate directionally, and the airflow jetted from the air-jet nozzles drive the impellers to operate better, the air jetted by the air-jet nozzle set (5, 13) is directional.

With the above technical solution, the HPCA is used to drive the engine, so as to achieve self-start and operation without being restricted by natural weather, ambient, and wind conditions. More importantly, when a power machine moves at a speed, the trunk shape inlets disposed on the impeller chambers 28 actively receives any external resistance airflow around the power machine to drive the engine, so as to convert strong wind resistance into power for use, thereby greatly reducing the power consumption. The wind-powered pneumatic engine of the present invention is widely applied to large, medium or small size cargo or passenger vehicles having steering wheels, railway trains, subway trains moving on land, marine power machines, aerospace power machines and all other power machines that move at a speed.

Referring to FIGS. 3 and 5, an HPCA regeneration, storage and supply system is provided, which includes the air tank 1, the first HPCA compressor 17, and the conical gear 16 for transmission. The power output of the impellers 6 is transmitted to the conical gear 16 through the right impeller main shaft auxiliary power conical gear 15, the conical gear 16 transmits the power output to the first HPCA compressor 17, and the HPCA generated by the first HPCA compressor 17 is input into and stored in the air tank 1.

Referring to FIG. 3, FIGS. 4(a), (b) and FIG. 5, an air-jet system includes the first controller 2, the distributor 3, the first air-jet pipe set 4, the first air-jet nozzle set 5, the second controller 10, the distribution controller 11, the second air-jet pipe set 12, the second air-jet nozzle set 13, the conical gear 8, the HPCA jet pipe 26, and the HPCA jet pipe 27. As shown in FIGS. 4(a), (b), the distribution controller 11 is a conventional gas distribution mechanism for motor vehicles, and includes cams (18, 19) and a valve set 9. The cam 19 in FIG. 4(a) has a distribution structure, and the cam 18 in FIG. 4(b) has a synchronous structure. The distribution controller 11 functions to convert the input HPCA into intermittent burst HPCA. During operation, the impellers 6 transmit the power to the conical gear 8 through the left impeller main shaft auxiliary power conical gear 7. If the conical gear 8 transmits the cam 18, the valve set 9 is opened and closed by the cam 18 synchronously to generate synchronous intermittent burst and jetted HPCA. If the conical gear 8 drives the cam 19 to rotate, or the valve set 9 is opened or closed in distribution by the cam 19, distributional intermittent burst and jetted HPCA is generated. The air tank 1 is connected with the distributor 3 through the HPCA jet pipe 26, and the first controller 2 is disposed on the HPCA jet pipe 26. The HPCA stored in the air tank 1 is input into the distributor 3 through the first controller 2, and is then diverged by the distributor 3 and input into each air-jet pipe of the first air-jet pipe set 4. Then, the HPCA is jetted into the impeller chambers 28 by each air-jet nozzle of the first air-jet nozzle set 5 connected with each air-jet pipe of the first air-jet pipe set 4. The air tank 1 is connected with the distribution controller 11 through the HPCA jet pipe 27, and the second controller 10 is disposed on the HPCA jet pipe 27. The HPCA stored in the air tank 1 enters the distribution controller 11 through the second controller 10. The intermittent burst HPCA is generated by the distribution controller and distributed to each air-jet pipe of the second air-jet pipe set 12, and the intermittent burst HPCA is then jetted into the impeller chambers 28 by each air-jet nozzle of the second air-jet nozzle set 13 connected with each air-jet pipe of the second air-jet pipe set 12.

During operation, the first controller 2 for the control of HPCA start and acceleration is turned on, such that the HPCA stored in the air tank 1 is jetted. The HPCA is distributed to the air-jet pipe set 4 through the distributor 3, and is transmitted to the air-jet nozzle set 5 by the air-jet pipe set 4, and the HPCA airflow jetted by the air-jet nozzle set 5 impels the impellers 6, such that the impellers 6 is started and accelerated to operate to generate power. The power is transmitted to the conical gear 8 by the left impeller main shaft auxiliary power conical gear 7, the conical gear 8 drives the cam (18 or 19) of the distribution controller 11 to be start and operate. Under the effect of the cam (18 or 19), the valve set 9 is opened and closed continuously, and the second controller 10 is turned on at the same time, such that the HPCA is jetted from the HPCA jet pipe 27 to be supplied to the distribution controller 11. At this time, as the valve set 9 is opened and closed continuously, the HPCA is converted into intermittent burst and jetted HPCA by the distribution controller 11 and is then output. The auto intermittent burst HPCA is then transmitted to the air-jet nozzle set 13 by the air-jet pipe set 12 for jetting. The automatic intermittent burst HPCA impels the wind-powered pneumatic engine impellers 6 including a plurality of sets of impellers to accelerate operation, such that the wind-powered pneumatic engine impeller flywheels 14 also accelerate operation to generate power accordingly, and the power is output by the gear box 32 and transmitted to the power machine. As the power machine moves at a speed, the external wind resistance airflow around the power machine during moving is guided into the impeller chambers 28 through the trunk shape inlets having large outer edges and small inner edges. The wind resistance airflow further impels the impellers 6 to operate to generate power output, thereby transforming the resistance into power. In addition, the power is output by the right impeller main shaft auxiliary power conical gear 15 and transmitted to the conical gear 16. The conical gear 16 transmits the first HPCA compressor 17 to operate, and the HPCA generated by the first HPCA compressor 17 is continuously supplemented to the air tank 1 for storage, such that the wind-powered pneumatic engine can continuously accelerate operation to generate power.

To meet the requirements of the amount of the HPCA during the controllable HPCA start and acceleration and the automatic intermittent burst air-jet acceleration of the wind-powered pneumatic engine, in the present invention, the diameter of the HPCA jet pipe 26 and the diameter of the HPCA jet pipe 27 are respectively several times greater than the total diameter of the diameter of air-jet nozzle set 5 plus the diameter of the air-jet nozzle set 13.

In order to make the double impellers 6 of the wind-powered pneumatic engine start and accelerate directionally to operate to generate power, in the present invention, the air-jet nozzle set 5 and the air-jet nozzle set 13 are designed to have a certain directional air-jet function.

As shown in FIG. 6, in order to overcome or reduce frictional resistance between valve stem heads 22 of the valve set 9 and cams 21 of the valve set 9 when the cams 21 of the distribution controller operate to open or close the valves, the present invention is further provided with a design of adding sliding balls 23 at the valve stem heads 22. In order to make the sliding balls 23 of the valve stem heads 22 slide smoothly, a lubrication oil passage 24 leading to the sliding balls 23 is added at the valve stem heads 22, such that the lubrication oil in a lubrication oil chamber 25 of the distribution controller 11 enters the surfaces of the sliding balls 23 through the lubrication oil passage 24, thereby achieving lubrication, reducing frictional resistance, improving operating speed of the wind-powered pneumatic engine, and generating greater output torque.

Figure 8:
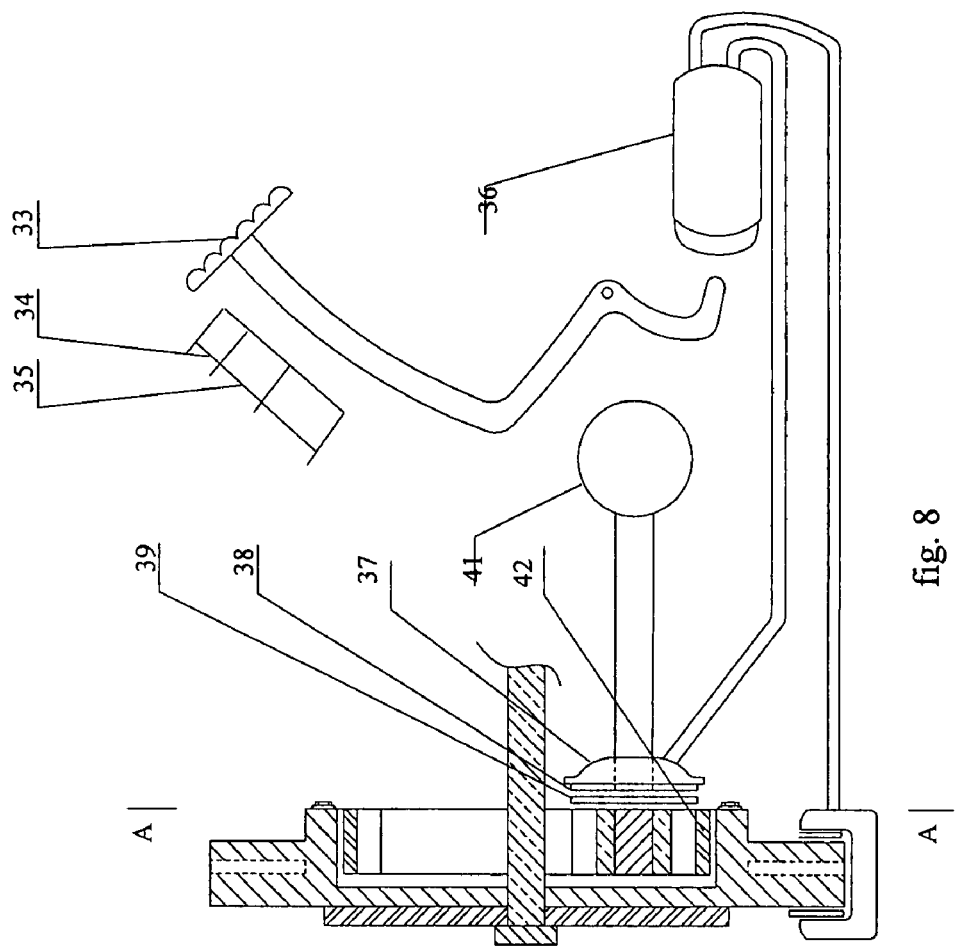
FIG. 8 is a schematic structural view of a deceleration and brake pressurizing system of the wind-powered pneumatic engine.
Figure 7:
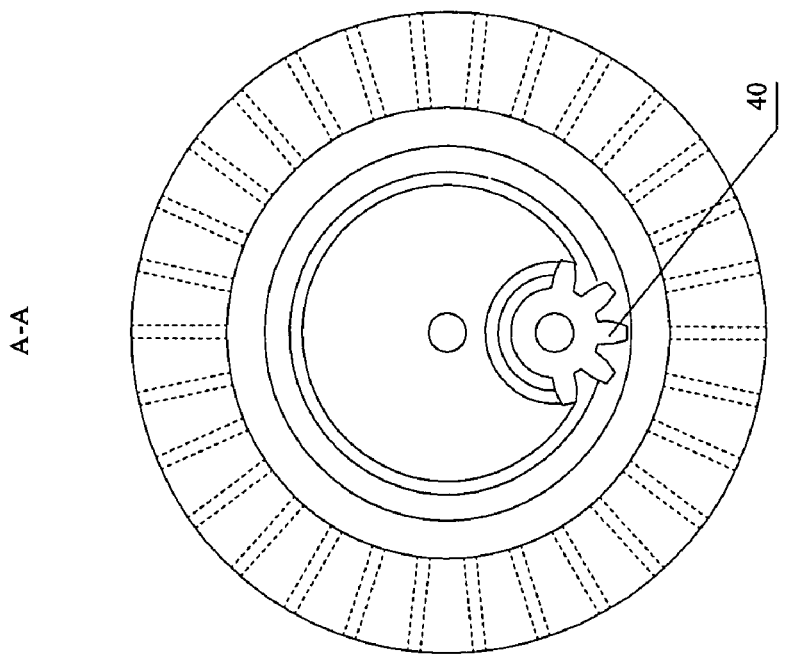
FIG. 7 is a schematic structural view of an internal gear transmission mechanism of a brake disc of a brake of a deceleration and brake pressurizing device.

Referring to FIGS. 7 and 8 together, the motor vehicle, when frequently decelerates, brakes, stops or restarts, consumes large amounts of HPCA. In order to supplement the excessive amount of HPCA consumed by the motor vehicle when it frequently decelerates, brakes, stops or restarts, and to ensure the amount of HPCA required when the wind-powered pneumatic engine restarts, the present invention provides a deceleration and brake pressurizing system capable of recycling the inertia power when the motor vehicle moving at a speed frequently decelerates and brakes and converting the inertia power into HPCA to be stored for reuse. The deceleration and brake pressurizing system includes a deceleration and brake pressurizing device 42 and a high-load second air compressor 41. The deceleration and brake pressurizing device 42 further includes a pedal 33, a hydraulic master pump 36, a clutch driven disc hydraulic working pump 37, a clutch driven disc 38, a clutch driving disc 39, and an internal gear transmission mechanism 40 of a brake disc of a brake. The pedal 33 drives the hydraulic master pump 36, the hydraulic master pump 36 drives the clutch driven disc hydraulic working pump 37, the clutch driven disc hydraulic working pump 37 impels the clutch driven disc 38 to abut against the clutch driving disc 39, and the internal gear transmission mechanism 40 of the brake disc outputs the inertia power generated when the motor vehicle decelerates to drive the high-load second air compressor 41 to work.

The operation process is described as follows. When it is required to decelerate, the pedal 33 is stepped down to reach a position of decelerating and pressurizing travel 35 from a free travel 34 of the deceleration and brake pressurizing device of the wind-powered pneumatic engine, the hydraulic master pump 36 starts to work, and functions on the clutch driven disc hydraulic working pump 37 to start the clutch driven disc hydraulic working pump 37 to work. The clutch driven disc hydraulic working pump 37 drives the clutch driven disc 38 to abut against the clutch driving disc 39, such that the inertia power of the motor vehicle, when decelerates, is directly transmitted by the brake disc internal gear transmission mechanism 40 to the high-load second air compressor 41, and the HPCA regenerated by the high-load second air compressor 41 is supplemented to the air tank 1 for storage, so as to be recycled and used.

Figure 9:
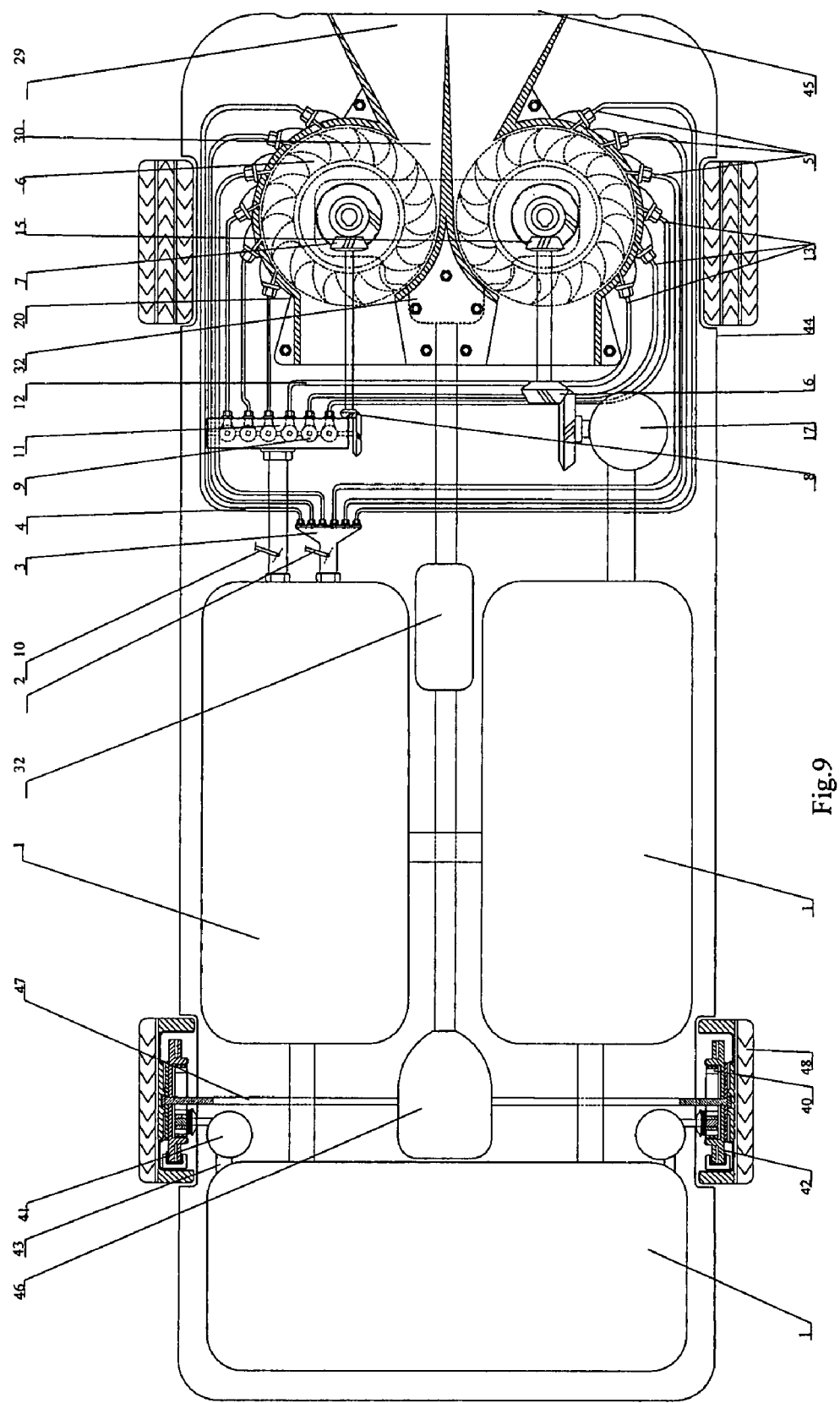
FIG. 9 is a schematic structural view of a motor vehicle equipped with the wind-powered pneumatic engine.

As shown in FIG. 9, a motor vehicle equipped with wind-powered pneumatic engine includes a vehicle body 44, a wind-powered pneumatic engine 20, a drive bridge 46, a half-axle 47 of the drive bridge, and tires 48. The structure of the wind-powered pneumatic engine 20 is shown in FIGS. 1 to 8. The wind-powered pneumatic engine 20 is disposed in the vehicle body 44, the outer edge 29 of the trunk shape inlets of the wind-powered pneumatic engine 20 is mounted at the front end of the vehicle body 44 at a position 45 where the wind resistance is the greatest. In order to increase the speed of the wind resistance airflow entering the impeller chambers 28, the diameter of the outer edge 29 of the trunk shape inlets is 1-30 times, preferably 3.6 times, of the diameter of the inner edge 30. An output of a main power output gear box 32 of the wind-powered pneumatic engine 20 is connected with the drive bridge 46 of the motor vehicle. The drive bridge 46 is connected with the half-axle 47 of the drive bridge, the half-axle 47 of the drive bridge is then connected with the tires 48, and the tires 48 are fixedly connected with the internal gear transmission mechanism 40 of the brake disc of the brake.

During operation, the first controller 2 for HPCA start and acceleration is turned on, such that the HPCA stored in the air tank 1 is jetted. The HPCA is distributed to the air-jet pipe set 4 through the distributor 3, and the HPCA airflow is jetted from the air-jet nozzle set 5 to impel the impellers 6 to start and accelerate to operate to generate power. The power is output to the conical gear 8 by the left impeller main shaft auxiliary power conical gear 7, the conical gear 8 drives the cam (18 or 19) of the distribution controller 11 to be started to operate. The second controller 10 for HPCA auto intermittent burst air-jet acceleration is turned on at the same time, such that the HPCA is jetted from the HPCA jet pipe 27 to be supplied to the distribution controller 11. The auto intermittent burst and jetted HPCA is output by the distribution controller 11, and is jetted through the air-jet nozzle set 13 after entering the second air-jet pipe set 12, so as to impel the impellers 6 to accelerate operation to generate power output. The internal HPCA stored in the air tank 1 drives the impellers 6 to operate to generate power. The power is transmitted to the gear box 32, and after the gear-shift of the gear box 32, the power is output to drive the tires 48 through the drive bridge 46 and the half-axle 47 of the drive bridge, so that the motor vehicle starts to move. Meanwhile, the power is transmitted to the conical gear 16 through the right impeller main shaft auxiliary power conical gear 15, and starts the first HPCA compressor 17 to operate through the conical gear 16. The HPCA generated by the first HPCA compressor 17 is supplied to the air tank 1 for storage, so as to be recycled and used by the wind-powered pneumatic engine, and thereby the wind-powered pneumatic engine 20 operates continuously to generate power output.

When the motor vehicle moves at a certain speed, the wind resistance airflow around the motor vehicle is guided by the outer edge 29 of the trunk shape inlets mounted in the front end of the vehicle body 44 at the position 45 where the wind resistance is the greatest, passes through trunk shape inlets and enters the impeller chambers 28. The wind resistance airflow further drives the impellers 6 to operate to generate power. Both the power and the power generated by the HPCA stored in the air tank 1 are output to the gear box 32, and after the gear-shift of the gear box 32, the power is output to drive the tires 48 of the motor vehicle to operate through the drive bridge 46 and the half-axle 47 of the drive bridge, such that the motor vehicle equipped with the wind-powered pneumatic engine moves at a higher speed.

When it is required to decelerate, the pedal 33 is stepped down to the position of decelerating and pressurizing travel 35, the hydraulic master pump 36 starts to work. The hydraulic master pump 36 impels the clutch driven disc 38 to abut against the clutch driving disc 39 through the clutch driven disc hydraulic working pump 37, such that the inertia power of the motor vehicle is transmitted to the high-load second air compressor 41 to work through the brake disc internal gear transmission mechanism 40, so as to recycle the breaking energy and convert it into regenerated HPCA to be stored in the air tank 1, so as to recycle and use the regenerated HPCA.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wind-powered pneumatic engine, comprising:
at least one impeller chamber and at least one impeller disposed in the impeller chamber, wherein the impeller chamber comprises an air inlet disposed thereon for receiving external wind resistance airflow, and external wind resistance airflow entering the air inlet drives the impeller to operate to generate power output; and
an air-jet system for jetting a high-pressure compressed air (HPCA) into the impeller chamber, wherein the HPCA jetted by the air-jet system in conjunction with the external wind resistance airflow entering the air inlet drives the impeller to operate to generate power output.

2. The wind-powered pneumatic engine as claimed in claim 1, wherein the air inlet for receiving the external wind resistance airflow is a trunk shape inlet having a large outer edge and a small inner edge.

3. The wind-powered pneumatic engine as claimed in claim 2, wherein the diameter of the outer edge of the trunk shape inlets is 1-30 times of the diameter of the inner edge.

4. The wind-powered pneumatic engine as claimed in claim 3, wherein the diameter of the outer edge of the trunk shape inlets is 3.6 times of the diameter of the inner edge.

5. The wind-powered pneumatic engine as claimed in claim 1, further comprising an HPCA regeneration, storage and supply system composed of an air tank and a first HPCA compressor connected with each other, wherein an output of the air tank is connected with the air-jet system, the first HPCA compressor is operably connected with the impeller, the power output generated after the impeller's operation drives the first HPCA compressor, and the HPCA regenerated by the first HPCA compressor is input into and stored in the air tank.

6. The wind-powered pneumatic engine as claimed in claim 5, further comprising a second HPCA compressor driven by an external braking force, wherein the second HPCA compressor is connected with the air tank, and the second HPCA compressor uses the external braking force to regenerate HPCA which is then input into and stored in the air tank.

7. The wind-powered pneumatic engine as claimed in claim 1, wherein the air-jet system comprises a first controller, a distributor, a first air-jet pipe set and a first air-jet nozzle set operably connected in sequence, the HPCA stored in an air tank is input into the distributor through the first controller, and is then diverged by the distributor and input into each air-jet pipe of the first air-jet pipe set, and the HPCA is then jetted into the impeller chamber by each air-jet nozzle of the first air-jet nozzle set connected with each air-jet pipe of the first air-jet pipe set.

8. The wind-powered pneumatic engine as claimed in claim 7, wherein the air-jet system further comprises a second controller, a distribution controller for converting the input HPCA into intermittent burst HPCA, a second air-jet pipe set, and a second air-jet nozzle set operably connected in sequence, the HPCA stored in the air tank is input into the distribution controller through the second controller, and the intermittent burst HPCA is generated by the distribution controller and distributed to each air-jet pipe of the second air-jet pipe set, and is then jetted into the impeller chamber by each air-jet nozzle of the second air-jet nozzle set connected with each air-jet pipe of the second air-jet pipe set.

9. The wind-powered pneumatic engine as claimed in claim 1, comprising two impeller chambers, each having an impeller disposed therein, wherein said at least one air inlet for receiving the external wind resistance airflow is disposed on at least one of the impeller chambers.

10. A motor vehicle, comprising a vehicle body, a drive bridge located within the vehicle body, a gear box located within the vehicle body and operably connected with the drive bridge, and tires operably connected with the drive bridge, said motor vehicle is characterized by further comprising a wind-powered pneumatic engine located within the vehicle body and having at least one impeller chamber and at least one impeller operably connected with the gear box and disposed in the impeller chamber, wherein the impeller chamber comprises at least one air inlet disposed thereon for receiving external wind resistance airflow, and the air inlet is a trunk shape inlet having a large outer edge and a small inner edge, the outer edge of the trunk shape inlet is disposed at a front end of the vehicle body pointing to a moving direction of the vehicle, the external wind resistance airflow entering the air inlet drives the impeller to operate to generate power output, the power output of the impeller is transmitted by the gear box to drive the drive bridge, and the drive bridge drives the tires supporting the vehicle body; and wherein the wind-powered pneumatic engine further comprises an air-jet system for jetting HPCA into the impeller chamber, the HPCA jetted by the air-jet system in conjunction with the external wind resistance airflow entering the air inlet drives the impeller to operate to generate power output.

11. The motor vehicle as claimed in claim 10, wherein the diameter of the outer edge of the trunk shape inlets is 1-30 times of the diameter of the inner edge.

12. The motor vehicle as claimed in claim 11, wherein the diameter of the outer edge of the trunk shape inlets is 3.6 times of the diameter of the inner edge.

13. The motor vehicle as claimed in claim 10, wherein the wind-powered pneumatic engine further comprises an HPCA regeneration, storage and supply system composed of an air tank and a first HPCA compressor connected with each other, an output of the air tank is connected with the air-jet system, the first HPCA compressor is operably connected with the impeller, the power output generated after the impeller's operation drives the first HPCA compressor, and the HPCA regenerated by the first HPCA compressor is input into and stored in the air tank.

14. The motor vehicle as claimed in claim 11, wherein the wind-powered pneumatic engine further comprises a deceleration and brake pressurizing system and a second HPCA compressor, the second HPCA compressor is driven by a braking force generated by the deceleration and brake pressurizing system when decelerated to regenerate HPCA, and the regenerated HPCA is input into and stored in the air tank.

15. The motor vehicle as claimed in claim 10, wherein the air-jet system comprises a first controller, a distributor, a first air-jet pipe set and a first air-jet nozzle set operably connected in sequence, the HPCA stored in an air tank is input into the distributor through the first controller, and is then diverged by the distributor and input into each air-jet pipe of the first air-jet pipe set, and the HPCA is then jetted into the impeller chamber by each air-jet nozzle of the first air-jet nozzle set connected with each air-jet pipe of the first air-jet pipe set.

16. The motor vehicle as claimed in claim 15, wherein the air-jet system further comprises a second controller, a distribution controller for converting the input HPCA into intermittent burst HPCA, a second air-jet pipe set, and a second air-jet nozzle set operably connected in sequence, the HPCA stored in the air tank is input into the distribution controller through the second controller, and the intermittent burst HPCA is generated by the distribution controller and distributed to each air-jet pipe of the second air-jet pipe set, and is then jetted into the impeller chamber by each air-jet nozzle of the second air-jet nozzle set connected with each air-jet pipe of the second air-jet pipe set.

17. The motor vehicle as claimed in claim 10, comprising two impeller chambers, each having an impeller disposed therein, wherein said at least one air inlet for receiving the external wind resistance airflow is disposed on at least one of the impeller chambers.

* * * * *